Figure 1:
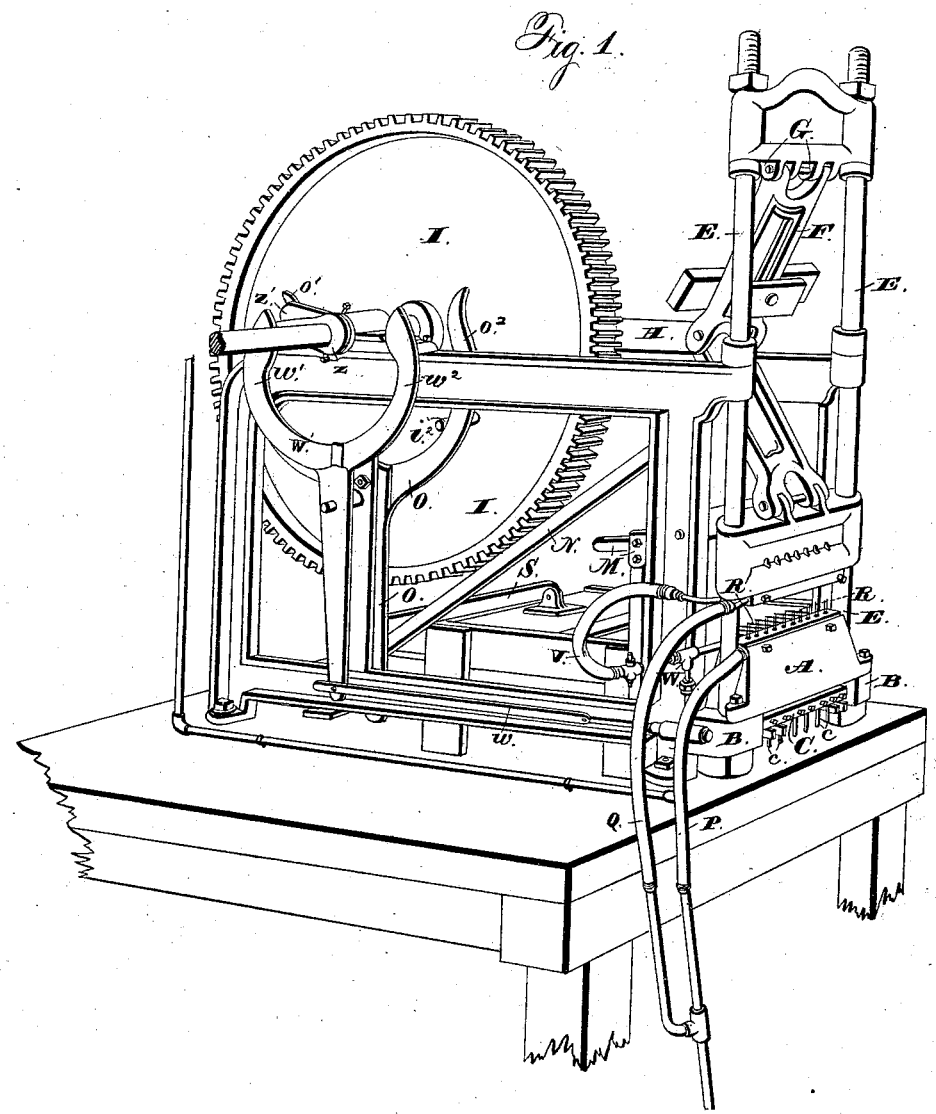

(No Model.)

P. L. SYLVESTER.
MANUFACTURE OF BUTTONS FROM PLASTIC MATERIAL.

No. 265,181.

6 Sheets—Sheet 1.

Patented Sept. 26, 1882.

(No Model.)

P. L. SYLVESTER.
MANUFACTURE OF BUTTONS FROM PLASTIC MATERIAL.

No. 265,181. Patented Sept. 26, 1882.

(No Model.)

P. L. SYLVESTER.

MANUFACTURE OF BUTTONS FROM PLASTIC MATERIAL.

No. 265,181.  Patented Sept. 26, 1882.

(No Model.)  6 Sheets—Sheet 5.
P. L. SYLVESTER.
MANUFACTURE OF BUTTONS FROM PLASTIC MATERIAL.
No. 265,181.  Patented Sept. 26, 1882.

(No Model.)
P. L. SYLVESTER.
MANUFACTURE OF BUTTONS FROM PLASTIC MATERIAL.
No. 265,181. Patented Sept. 26, 1882.
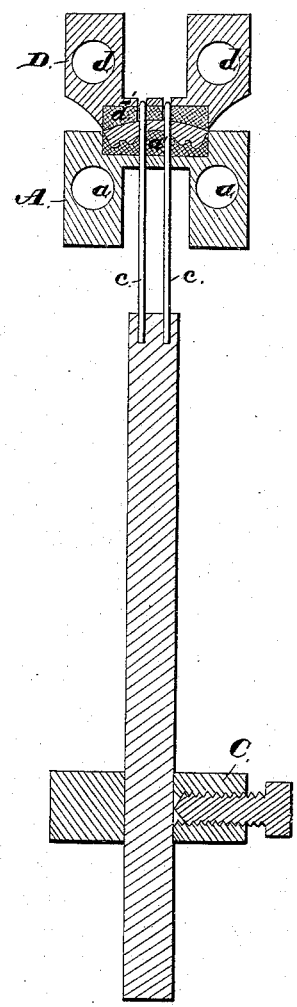
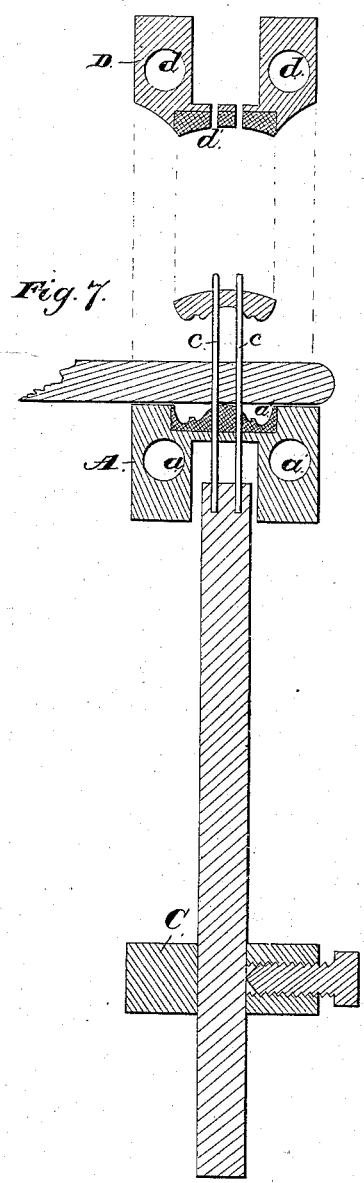
Witnesses:
Jas. E. Hutchinson.
Henry C. Hazard.
Inventor:
P. L. Sylvester, by
Geo. S. Prindle, his Atty

UNITED STATES PATENT OFFICE.

PHILIP L. SYLVESTER, OF AUBURN, NEW YORK, ASSIGNOR TO WOODRUFF BROTHERS, OF SAME PLACE.

MANUFACTURE OF BUTTONS FROM PLASTIC MATERIAL.

SPECIFICATION forming part of Letters Patent No. 265,181, dated September 26, 1882.

Application filed July 8, 1882. (No model.)

*To all whom it may concern:*

Be it known that I, PHILIP L. SYLVESTER, of Auburn, in the county of Cayuga and State of New York, have invented certain new and useful Improvements in the Manufacture of Buttons and other Articles from Plastic Materials; and I do hereby declare that the following is a full, clear, and exact description thereof, reference being had to the accompanying drawings, making a part of this specification.

Previous to my invention buttons have been formed of plastic materials by compressing the same in dies whose cavities correspond in form with the exteriors of the buttons to be made, the eyes or holes for the passage of thread being made by means of fixed pins which perforate the material. After the buttons have been formed by pressure they have been removed from the dies by separating the latter by hand and jarring them, so as to detach the buttons from the pins and from the die which holds them. In making such buttons as above described the dies have been put together, have been applied to a hand-press, have been pressed therein, have been removed therefrom, and the buttons have been discharged by manual labor, the dies being placed by the workmen on steam-tables separate from the presses before the application of the plastic material, (so that the latter may be in a warm condition when molded by pressure,) and being permitted to cool before the buttons are discharged. This system of manufacture involves not only a large amount of manual labor, but requires that the workmen employed shall be skillful, and shall be muscularly strong enough for the work.

The object of my invention is to enable power derived from a steam-engine or other motor to be substituted for manual labor in the manufacture of buttons from plastic materials, and the automatic operation of mechanism to be substituted for the skill of the present operators, all the labor that is required when my complete invention is employed being that involved in supplying the plastic material, which may be done by children.

To the said end my invention consists of certain combinations of mechanical devices which are set forth in the claims at the close of this specification. In order that these may be fully understood, I have represented in the accompanying drawings, and will proceed to describe, the machine which I have constructed to embody all parts of my invention in mechanism and to practice my mode of operation, it being understood that the form of the machine and its parts may be greatly varied without ceasing to embody my new combinations of devices.

Figure 2:
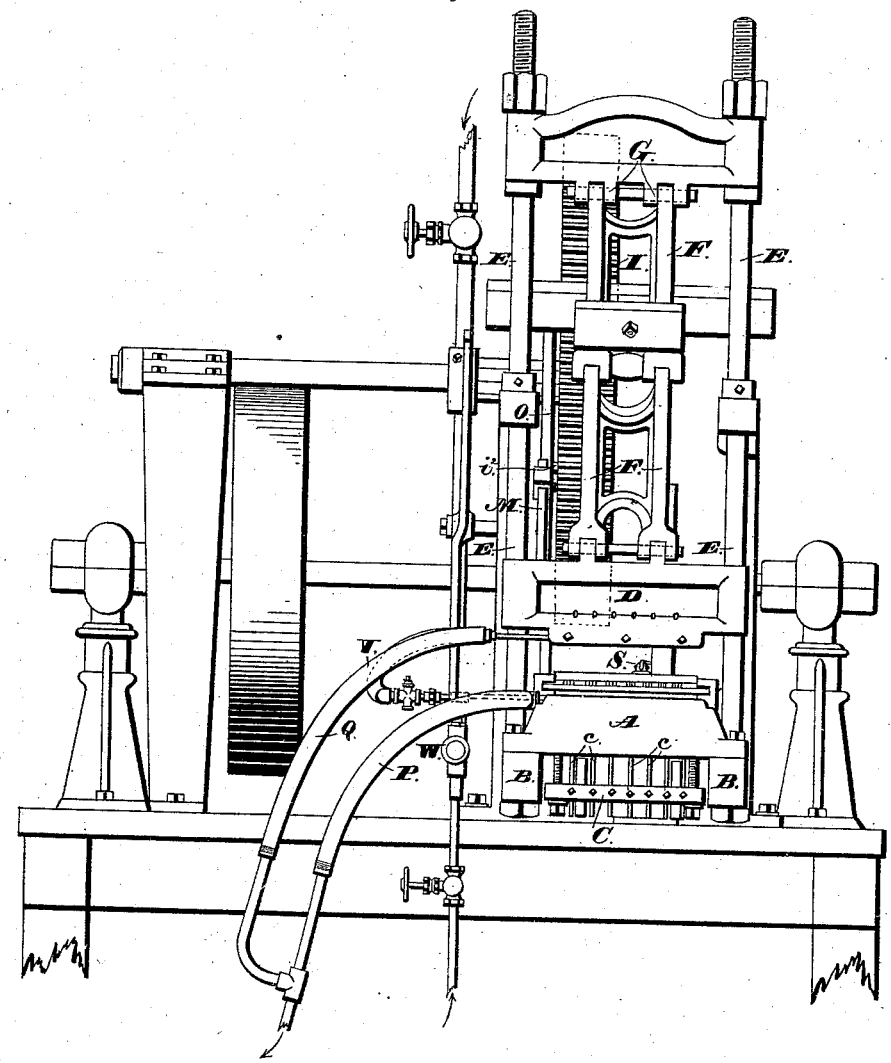
Figure 3:
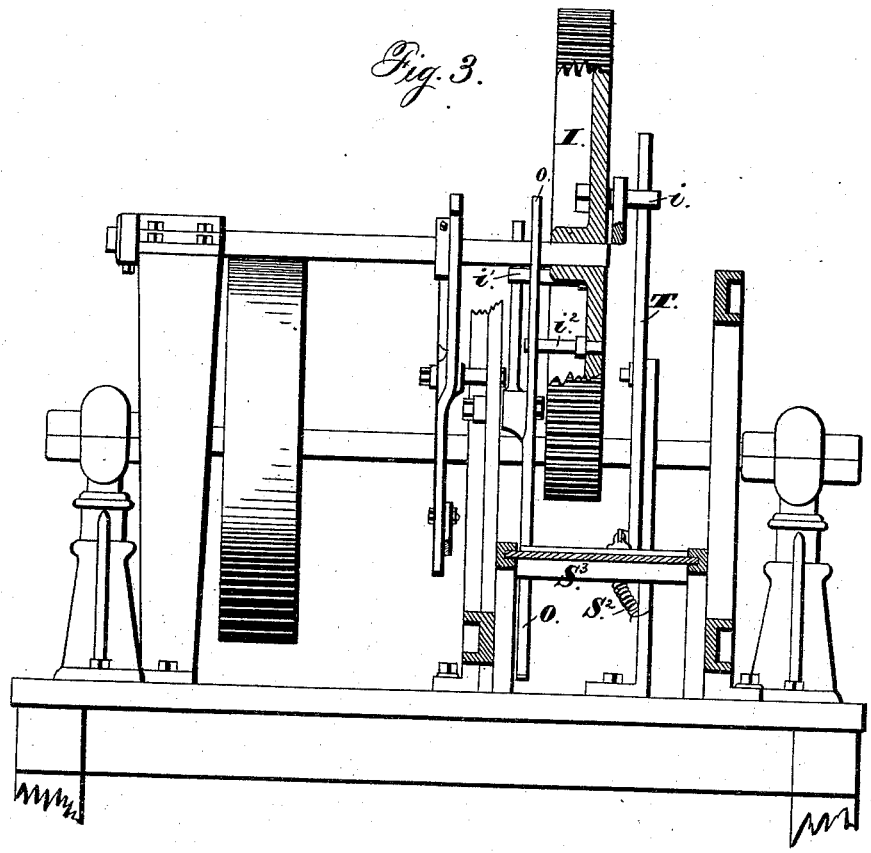
Figure 4:
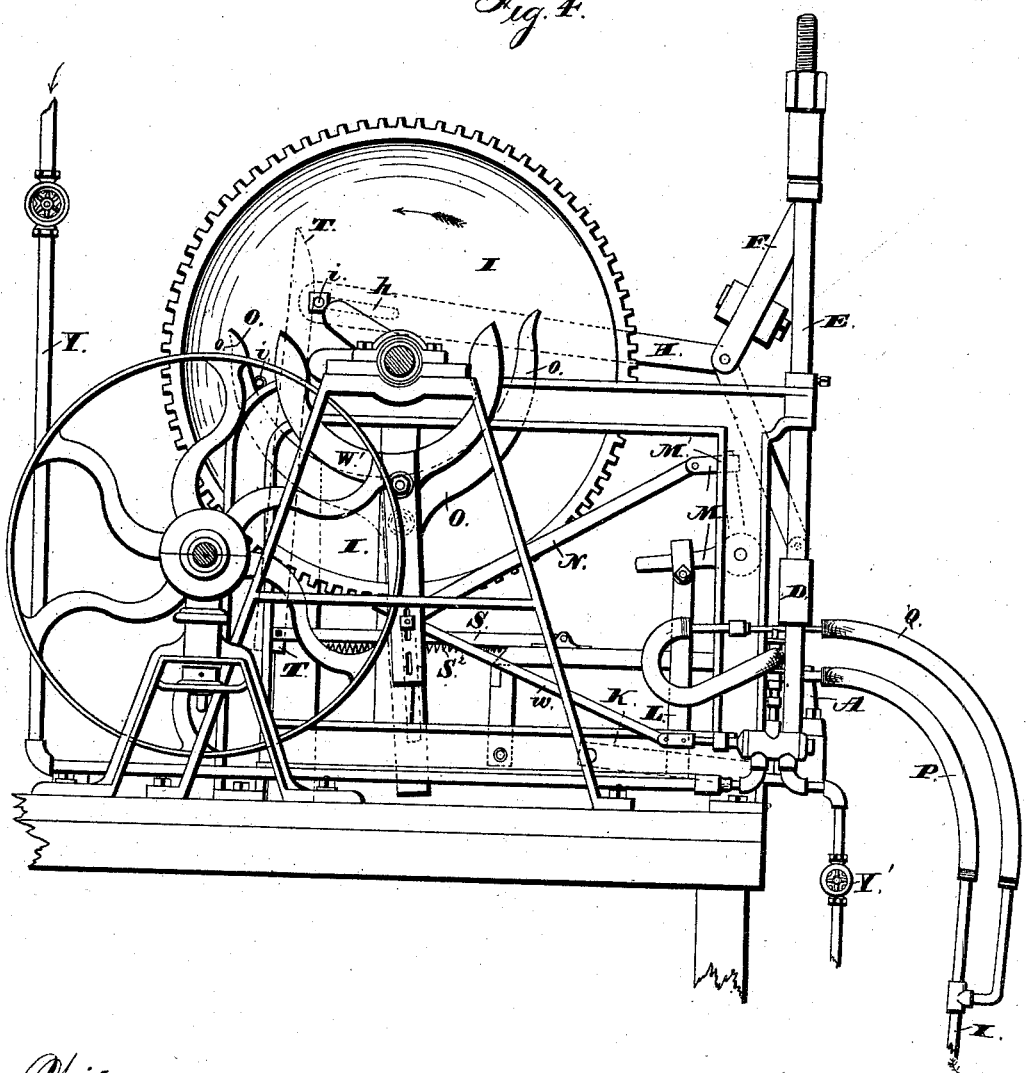
Figure 5:
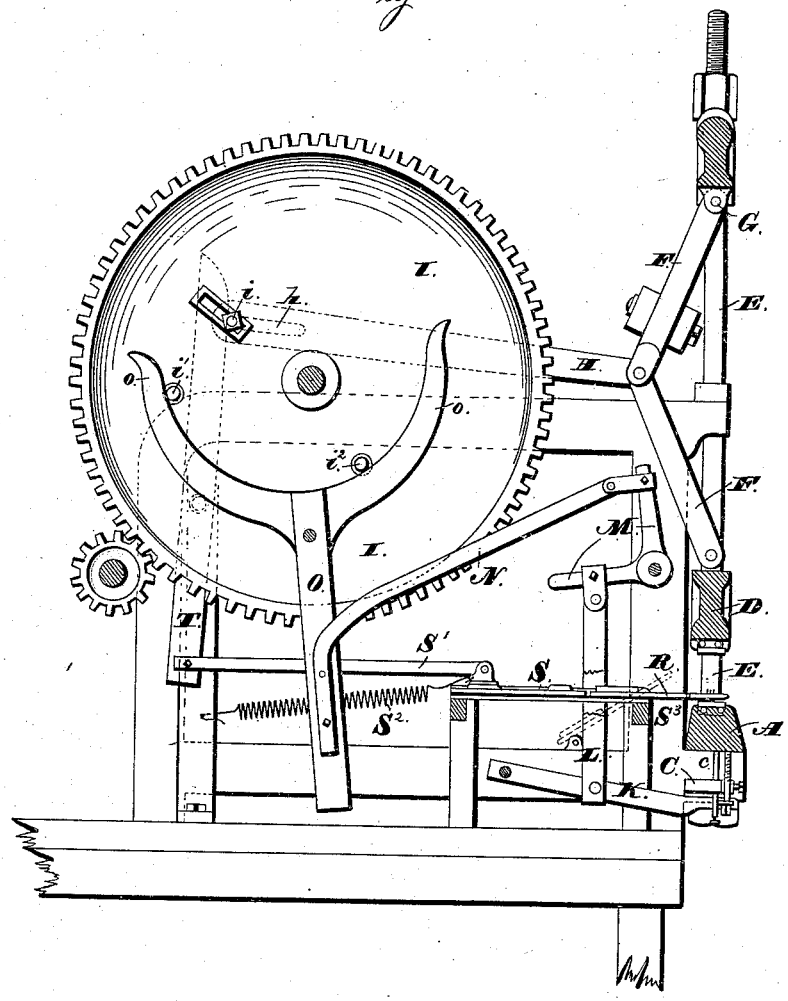

Figure 1 of said drawings is a perspective view of my said machine. Fig. 2 is a front view of the same. Fig. 3 is a similar view to Fig. 2, but with certain portions removed and others shown in section. Fig. 4 is a side view of the machine. Fig. 5 represents a section of the machine, parallel with the side thereof. Fig. 6 represents a sectional view of certain parts of the machine drawn upon a larger scale than the other figures, the die-blocks being closed. Fig. 7 represents a similar sectional view with the die-blocks open.

The same parts of the machine represented in the different figures are designated by the same letters.

The said machine is fitted with two die-blocks, A and D, by means of which the buttons or other articles are molded into the desired form. For this purpose each die-block has formed in it one or more recesses or die-cavities, each cavity being of the form of the part of the button to be molded by its action, and each die-block being by preference constructed with a series of such die-cavities arranged in rows. The die-cavities in the die-block A correspond in shape and size with the face side of the buttons to be made, while those in the die-block D correspond in shape and size with the backs of the buttons to be made. The lower die-block is secured to the base or frame B of the machine, and the upper die-block, D, is constructed to slide toward and from the lower or fixed die, A, upon guides E.

In order that the movable die-block D may be automatically moved toward and from the fixed die A, and may be pressed upon the material between the two, the former is connected by a pair of toggle-levers, F, with the cross-head G of the machine, that is sustained in its relationship to the fixed die by the guide-posts E, which are extended upward for that purpose. The toggle-levers are caused to raise and to depress the movable die by means of a stud or crank-pin, $i$, which is secured to a wheel, I, and is connected with the knuckle or knee joint of the toggle-levers by means of the connecting-bar H, so that the revolution of said stud $i$ by the wheel I alternately flexes and straightens the toggle-levers F, and thereby alternately raises the movable die-block D from the fixed die-block A and depresses the former with sufficient force to compress the plastic material into the cavities of the die-blocks. In order that the wheel may be revolved for this purpose it is connected by cog-gear with a driving-shaft to which power may be applied by a driving-belt.

In order that the thread passages or eyes may be formed in the buttons, the die A is perforated to receive a series of pins, $c$, one or more for each cavity of the die-block. The upper ends of these pins, during the molding of the buttons, protrude into the die-cavities, and correspond in shape and form with those of the thread-passages to be produced; and in order that they may operate as ejectors of the buttons they are by preference tapering or conical. The shanks or stocks of the pins are by preference cylindrical, and they pass downward through the perforations of the die-block, and are connected with a pin-plate, C, by whose movement the pins may be raised and depressed.

In order that the pin-plate C may be raised and depressed automatically, it is connected with the front ends of a pair of levers, K, which are pivoted at their rear ends to the frame of the machine. At points intermediate between the front and rear ends of these levers they are connected by rods L with arms M, that project from a rock-shaft which is fitted to rock upon pivots secured to the frame of the machine, and is fitted with an arm, M'. This arm is connected by a rod, N, with an upright vibrating forked lever, O, whose prongs $o'$ $o^2$ are within the range of motion of two pins, $i'$ and $i^2$, which are secured to the wheel I and project from its face, and which have such relative positions to the prongs of the lever O that as the said wheel is revolved one of the pins acts on one fork of the forked lever to raise the pin-plate C and its pins, while the other pin acts at the proper time upon the other fork of the vibrating lever O to depress the pin-plate and its pins. The pins $i'$ and $i^2$ are so set in the wheel I relatively to the crank-pin $i$, that operates the movable die-block D, that the thread-eye pins are raised just after the die-block D is raised from the die-block A, and are depressed or lowered before the die-block D is depressed. As the thread-eye pins are tapering, they cannot slide through the thread-eyes. Hence when these thread-eye pins are raised they act as ejectors to eject the buttons from the cavities of the fixed die A.

In order that the buttons may be removed from the thread-eye pins or ejectors, the dischargers R are provided. These dischargers consist, in this example of my invention, of a series of rods which are connected at their rear ends with a cross-head which is pivoted in a sliding frame, S, the rear part of the cross-head which is behind the pivots being either made heavier than the weight of the rods and part of the cross-head in front of said pivots, or being loaded, so that the excess of weight in the rear of the pivots tends to tip the points of the rods (with the buttons upon them) upward. The sliding frame S is connected by a rod, S', with the lower end of an upright lever, T, that is pivoted to the frame of the machine, with its upper end within the range of revolution of the pin $i$ of the wheel I. Hence as this pin is revolved it comes in contact with the lever T during its rearward movement and causes the dischargers to be projected forward, and as the pin $i$, in its revolution, moves toward the front of the machine it permits the strippers to be drawn backward by means of a spring, $S^2$, provided for that purpose. When the dischargers are in their most rearward position the excess of weight of the rear part of their cross-head causes them to incline upward. In order that these dischargers may be tipped downward as they are advanced over the fixed die-block A, a tipping-bar, $S^3$, is arranged beneath them, within the range of movement of the under side of the rear of the stripper cross-head. Hence when the strippers are advanced the under side of the cross-head is moved against this tipping-bar, and is thereby raised so as to tip the points of the dischargers downward; and when the cross-head, with the dischargers, is drawn backward past the tipping-bar the preponderating weight of the rear of the cross-head causes it to tip as it passes the tipping-bar, thus raising the points of the dischargers. The movement of the dischargers in the machine represented is so timed relatively to the upward movement of the ejectors that the dischargers are moved forward after the buttons are ejected from the molds and pass beneath the buttons. Hence when the ejectors are depressed the dischargers stop the downward movement of the buttons and discharge them from the ejectors. Then when the dischargers are moved backward the buttons are carried with them, and when the dischargers tip the buttons glide down them into a receptacle provided for the purpose.

The plastic material which I prefer to use in the manufacture of buttons is one which is rendered plastic by heat and hardens when cooled. In order that this material may be kept in a sufficiently heated state during its compression in the die-cavities, and may be subsequently hardened by cooling it before the ejection of the buttons, the die-blocks are channeled—that is, they are constructed with one or more internal channels through which heating and cooling fluids—such as steam and cold water—may be passed alternately. In the machine represented in the drawings each die-block A and D is channeled, the internal channels, $a$ or $d$, Figs. 6 and 7, commencing at one end of the die-block, extending nearly to the opposite end, and thence returning to the first end. One end of each internal channel is connected by a connecting-pipe, V, with a valve-case, W. The other end of each internal channel is connected by a connecting-pipe, P and Q, with a discharge-pipe, X, which in this case is common to both die-blocks. As the upper die-block, D, is movable during the operation of the machine, its connecting-pipes V Q are flexible hose-pipes.

By preference a single valve-case W is used to control both the supply of water and of steam, and for this purpose it is connected with a steam-supply pipe, Y, and with a cold-water-supply pipe, Y'. The valve in the valve-case W, in this example, is a plain sliding piston, which, when moved in one direction, connects the supply connecting-pipes V of the internal channels in the die-blocks with the steam pipe Y, at the same time shutting off the supply of cold water, and when moved in the other direction shuts off the supply of steam and admits water from the water-supply pipe Y'. In order that the water and steam may be automatically supplied in proper order, the valve-stem of the supply-valve is connected by a rod, $w$, with a forked lever, W', which is pivoted to the frame of the machine, with one of its prongs, $w'$, within the range of revolution of a tappet-arm, $z$, secured to the shaft of the wheel I, and with its other prong, $w^2$, within the range of the tappet-arm $z'$. These tappet-arms $z\ z'$ are so set relatively to the crank-pin $i$, which operates the upper die-block, D, that steam is supplied to the die-blocks after the buttons are ejected, for the purpose of heating the die-blocks; and that after the material is pressed into buttons the steam is shut off and the water is let into the die-blocks to cool them and insure the rapid hardening of the material by the abstraction of its heat.

In the form of the machine represented in the drawings the movement of the movable die-block is effected by the continuous revolution of a crank-pin, $i$. In order that in such case the pressure upon the material may be continued until the buttons are sufficiently cooled, the connecting-bar H, which transmits motion to the toggle-levers of the press, has its eye (which fits upon the crank-pin $i$) elongated and constructed in the form of a slot, as represented at $h$. Hence when the crank-pin has moved the parts connected with it in one direction to the farthest limit the first portion of its revolution in the return direction is effected in the elongated eye $h$, and the movable die remains at rest until the crank-pin has traversed the length of the elongated eye.

In order that the die-blocks may be easily and quickly adapted to the formation of buttons having surfaces of different configurations, each die-cavity is preferably formed at the end of a plug, $a'$ or $d'$, Fig. 6, which is sunk in a socket in the die-block. Hence the configurations of the buttons may be varied by changing the plugs of one or both die-blocks, as found expedient.

While the channeled dies above described and their combinations are adapted more particularly to the manufacture of buttons, they are useful for the production of similar articles from plastic material which requires to be molded in a hot condition.

When the machine is in operation strips of plastic material previously warmed on a steam-table are placed by an attendant over the cavities of the lower die-block while the dies are separated. The automatic operation of the machine then forces the upper die-block down upon the lower, (thereby compressing the material into the cavities of the dies and upon the eye-pins,) shuts off the supply of steam to the channels of the die-blocks, opens the supply of water thereto, removes the upper die-block, ejects the buttons by raising the ejectors, discharges the buttons from the ejector-pins, returns the ejectors to their depressed positions, shuts off the supply of water, and opens the supply of steam to the die-channels. The whole work of molding the buttons from the supply of the plastic material is thus effected by the automatic operation of the machine.

In the machine above described the ejectors are constructed to both eject the buttons from the die-block and to act as eye-pins in forming the thread-eyes of the buttons. While this construction of ejectors is advantageous, it is not essential to certain parts of my invention, as cases occur in practice in which buttons are molded with shanks which are not perforated in the direction in which the ejector is moved. In such cases the ejector may be a piston whose acting end, when lowered, is flush with the face of the cavity of the die. When such an ejector is raised it forces the button out of the die-cavity, thereby ejecting it. On the other hand, when thread-eye pins are used they need not necessarily form part of the ejector, as it may be a piston perforated to slide upon the thread-eye pins, which in such case may be fixtures in the die-cavity, so that the upward movement of the ejector pushes the buttons off the thread-eye pins. In either of the latter cases the discharger may be so constructed as to either push or pull the ejected buttons laterally over the die-block.

The machine above described is constructed to operate with the faces of the die-blocks set horizontally; but this arrangement is not essential to my invention, as the die-blocks may be arranged with their faces upright, provided the other parts of the machine be correspondingly arranged, and provided a device be added to hold the material from dropping edgewise from between the dies until they grip it. When the dies are arranged in this manner the buttons, when ejected from the die-cavities, drop at once, thus rendering the dischargers unnecessary.

In the machine above described but one sliding valve is used to control the supply of both steam and water. While this form of valve is advantageous, my invention is not restricted thereto, as a turning valve—such as a three-way cock—may be used; or separate valves (either turning or sliding) may be employed for the water and steam supply.

In the preceding description the thread-eye pins have been described as having tapering points, and this form is preferred. It is not, however, a necessity, as the adhesion of the material to the thread-eye pins is sufficient to cause the buttons to be raised from the cavities of the die-block with the eye-pins, even if their points are not tapering.

I claim as my invention—

1. As an improvement in the manufacture of buttons from plastic material, die-blocks constructed with die-cavities of the forms and sizes of the parts of the buttons to be molded therein, and adapted to be closed together, and provided with means whereby they may be heated for the compression of the said plastic material, and then cooled to harden the same, substantially as and for the purpose shown.

2. The combination, substantially as before set forth, of the die-block constructed with a die-cavity of the form and size of the part of the button to be molded therein, and the ejector for ejecting the molded button from said die-cavity.

3. The combination, substantially as before set forth, of the die-block constructed with a die-cavity of the form and size of the part of the button to be molded therein, and the ejector which both forms the thread-eye in the button and ejects the molded button from the said die-cavity.

4. The combination, substantially as before set forth, of the die-block constructed with a die-cavity of the form and size of the part of the button to be molded therein, the ejector which ejects the buttons from the said die-cavity, and the discharger which discharges the ejected buttons.

5. The channeled die-block, constructed substantially as before set forth, with a die-cavity of the form and size of the part of the button to be molded therein, and with an internal channel for the passage of heating and cooling fluids.

6. The combination, substantially as before set forth, of the die-block channeled internally for the passage of a fluid, and the ejector for ejecting the article from the cavity of said die-block.

7. The combination, substantially as before set forth, of the channeled die-block, the connecting-pipes, the valve, and the means of operating said valve, whereby steam and water may be automatically and alternately supplied to the internal channel of the die-block.

8. The apparatus, substantially as before described, in which die-blocks provided with interior channels, actuating mechanism whereby the same are moved toward and from each other, automatically-operating steam and water mechanism for alternately heating and cooling said die-blocks, and mechanism for forming thread-openings in buttons, and for removing the same from said dies, are combined and adapted to operate substantially in the manner and for the purpose set forth.

In witness whereof I have hereto set my hand this 8th day of June, A. D. 1882.

PHILIP L. SYLVESTER.

Witnesses:
DOUGLAS BEARDSLEY,
JOHN H. BACON.